July 25, 1950     E. R. BURLING ET AL     2,516,447
METHOD AND APPARATUS FOR CHEMICAL TREATMENT
Filed Feb. 24, 1947     3 Sheets-Sheet 1
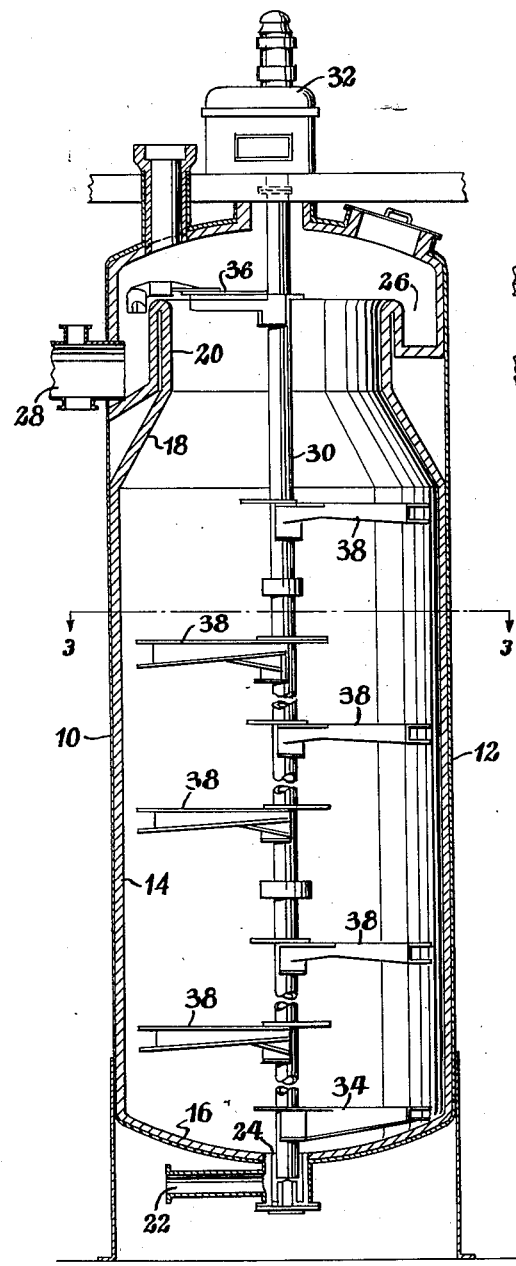
Fig. 1
Fig. 2
Fig. 3
Inventors:
E. R. Burling
J. P. Rich
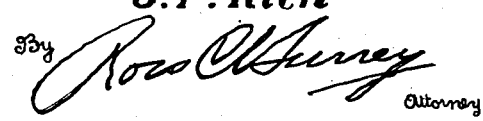
Attorney July 25, 1950   E. R. BURLING ET AL   2,516,447
METHOD AND APPARATUS FOR CHEMICAL TREATMENT
Filed Feb. 24, 1947   3 Sheets-Sheet 3

Inventors:
E. R. Burling
J. P. Rich
By Ross C. Hurrey
Attorney

Patented July 25, 1950

2,516,447

UNITED STATES PATENT OFFICE 2,516,447

METHOD AND APPARATUS FOR CHEMICAL TREATMENT

Elmer R. Burling and John P. Rich, Nashua, N. H.

Application February 24, 1947, Serial No. 730,474

10 Claims. (Cl. 8—156)

It is an object of this invention to provide a method and apparatus for the chemical treatment of suspended solids in which the uniformity of such treatment is greatly improved over the results heretofore attained.

It is a further object of this invention to provide an improved construction of rotary equalizer arms for use in chemical treatment towers.

Figure 4:
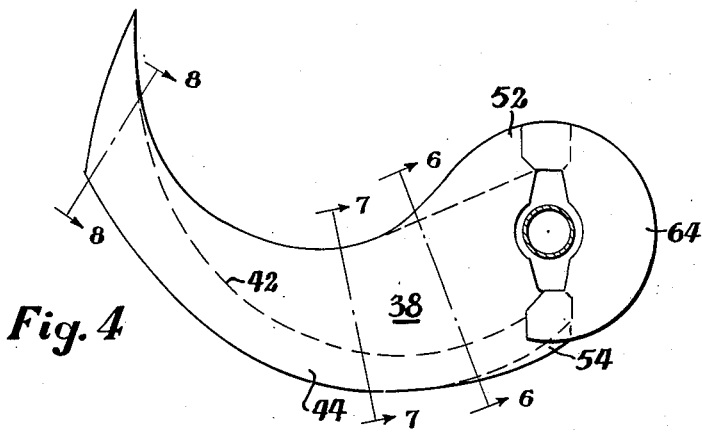
Figure 5:
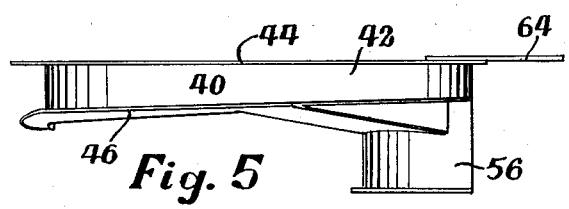
Figure 6:
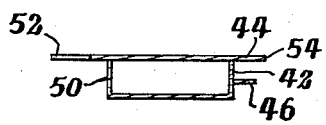
Figure 7:
Figure 8:
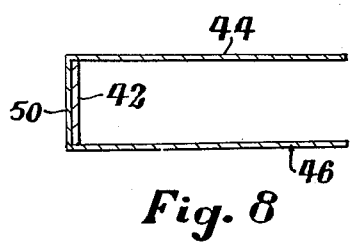
Figure 9:
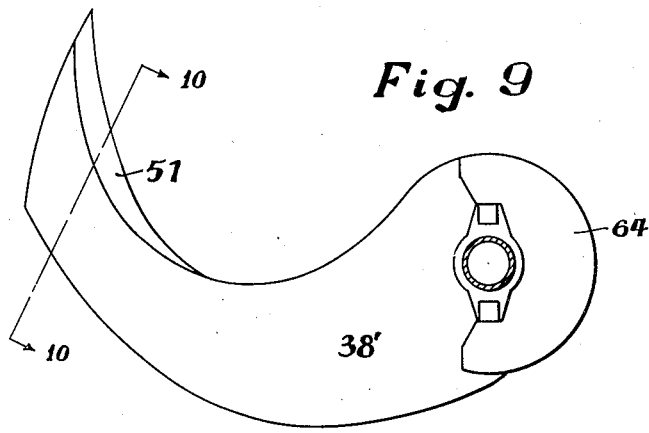
Figure 10:
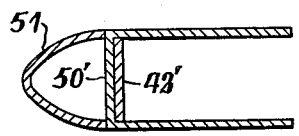
Figure 11:
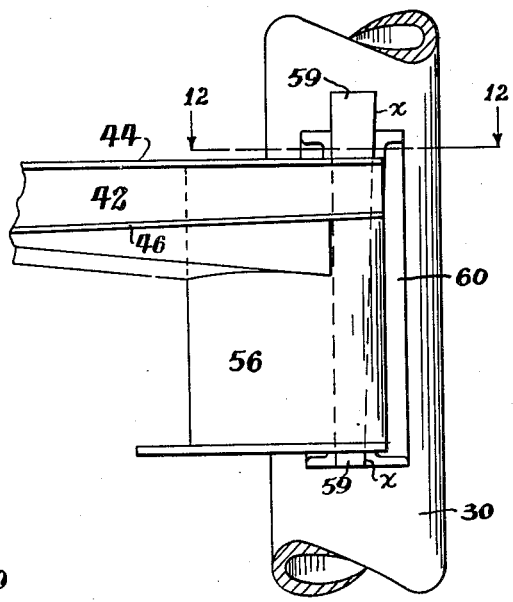
Figure 12:
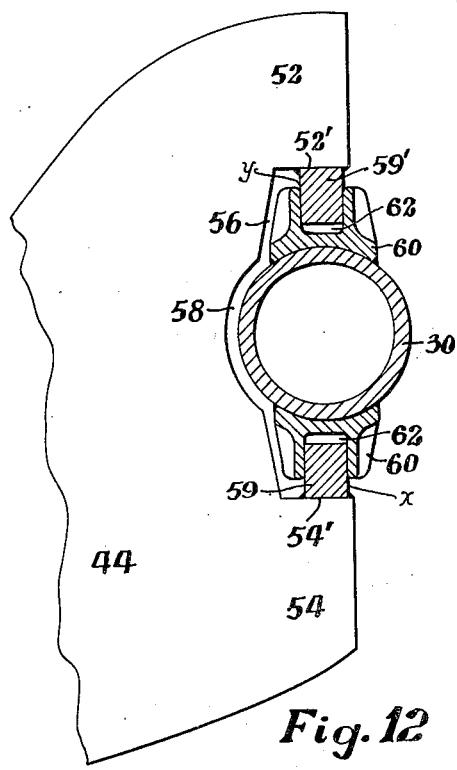

The above and other objects will be made clear from the following detailed description taken in connection with the annexed drawings in which:

Fig. 1 is a vertical cross-section of a typical treatment tower equipped with the improved equalizer arms, Fig. 2 is a plan view of the tower shown in Fig. 1, Fig. 3 is a section on the line 3—3 of Fig. 1, Fig. 4 is an enlarged plan view of one of the equalizer arms, Fig. 5 is an elevational view corresponding to Fig. 4, Figs. 6, 7 and 8 are respectively sections taken on the lines 6—6, 7—7 and 8—8 of Fig. 4, Fig. 9 is a plan view of a modified form of arm, Fig. 10 is a section on the line 10—10 of Fig. 9, Fig. 11 is an enlarged elevation of a structure by which an arm is keyed to the shaft, and Fig. 12 is a section on the line 12—12 of Fig. 11.

This invention is applicable wherever a mass of divided solids is to be subjected to the action of a chemical in solution or to any chemicals or solvents in liquid form. The present discussion is directed to bleaching or like treatment of wood pulp but the invention is not to be understood as limited to this only.

A typical treatment is to suspend 4% by weight of pulp in a solution of, say 10%, sodium hypochlorite. Since the liquid phase is a true solution, there is perfect distribution of the hypochlorite in the water, and since there are 24 tons of solution for each ton of pulp, perfect distribution of pulp throughout the liquid may reasonably be assumed. The treatment, therefore, will be uniform if all portions of the pulp are exposed to the solution for the same length of time. Batch operations, when periods of as much as three hours of exposure are required and where many tons of pulp are involved, require inordinately large and costly installations. Moreover, batch operations lack uniformity because of differences in the time required for filling and dumping storage tanks or vats. For these reasons it has become customary to use treating towers with the pulp in suspension being continuously supplied at the bottom and continuously removed at the top. The size of the tower is computed relative to the rate of supply of the slurry so that theoretically from two to three hours is required for a given fiber to move from the entrance to the exit of the tower. A typical tower has an altitude of 60 feet and a diameter of 16 feet.

It is customary to run a shaft through the center of such towers and to mount straight horizontal arms on the shaft. These are supposed to "agitate" the slurry and, therefore, to secure uniformity of treatment. Actual tests have shown, however, that in such towers equipped with such agitators a substantial proportion of the pulp travels from entrance to exit in from 15 to 30 minutes instead of a theoretical three hours and that merely to increase the amount of agitation, as by speeding up the rotation, does not materially alter this condition but does entail excessive power consumption. It is believed that the prior art has misconceived the function of the agitators. What is required is not "mixing" or "agitating" but an equalization of the rate of progress of the slurry through the tower, such equalization to take place across all horizontal cross sections.

If no central shaft were provided and there were no agitation of any sort, it is clear that stock would rise more rapidly at the center of the tower than along the periphery so that stock emerging at the top of the tower would represent a mixture of a large proportion of insufficiently treated pulp coming up through the center, a small proportion of properly treated stock and a substantial proportion of overtreated stock. Precisely what the proportions would be is necessarily a matter of pure conjecture since there is simply no means available for accurate observation of the velocity pattern across the tower. The presence of the central shaft apparently tends to accentuate the problem, since there appears to be a distinct tendency for accelerated passage of stock along the shaft. The problem of securing uniformity involves either acceleration of the travel of pulp adjacent the periphery or retarding the progress of pulp at the center or both. The present invention attacks both aspects of the problem by using, instead of conventional "agitator arms," positive radial impeller blades which continuously and positively move stock radially outwardly. The stock so moved necessarily continuously returns radially inwardly. The result is a constant radial interchange of stock between the center and the periphery, the net effect being equalization, as between center and periphery, of the time required for the average fiber to travel the entire length of the tower.

Observation of the effect of these impeller blades during the filling of a tower indicates that the blade continues to exert an effect on the stock at least to the point of producing rotation of the whole mass of stock up to a depth of from two or three feet above each blade. It is not desired to swirl the entire mass of stock substantially at the speed of the blade since if this occurred there would be no relative movement between the blade and the stock and the equalization or radial impelling effect of the blade would, therefore, be nullified. Accordingly, such blades should be spaced axially of the tower a sufficient distance so that the swirling effect of a lower blade is suppressed before the stock encounters the next upper blade. The factors governing the spacing of the blades are the dimensions and profiling of the blade itself, its R. P. M. and the consistency of the stock. Clearly this spacing would be different for each combination of blade profile, consistency and R. P. M. For any particular tower, therefore, it is necessary to select a spacing which will not produce a complete swirling of all the stock in the tower under any conditions which the tower is intended to encounter. In a tower 60 feet high and 16 feet in diameter intended for the treatment of wood pulp at consistencies between 3% and 6%, a spacing of approximately 5 feet seems to be satisfactory to avoid this swirling effect.

One of the greatest difficulties in perfecting the operation of large treating towers lies in the lack of means for making more than the most limited direct measurements and observations. There are many variables which singly and in combination affect performance. For a given design of arm and a given rotative speed there will always be a critical consistency below which the slurry throughout the entire body of the tower will tend to revolve at the same speed as the arm, and if this takes place the effect of the arms as equalizers of flow is destroyed. Similarly for any given arm and consistency there is a rotation speed at which the same phenomenon will take place. Slurries of 3 and 4% consistency are extremely opaque so the only direct observation which can be made is during the filling of a tower. This is slightly informative concerning the behavior of the stock adjacent each arm, but, of course, tells nothing about the behavior of the stock adjacent the deeply submerged arms. The most effective test in the operation of a bleaching tower is to cut off the supply of hypochlorite for an interval and note the time elapsing between the cutting off of hypochlorite and the appearance of brown stock at the top of the tower. This is a good indication of the minimum time of transit of stock through the tower, but there is no very accurate means for determining the percentage of stock which moves at such minimum time because whatever percentage might be revealed by analysis at any particular time has no necessary correspondence with the percentage actually emerging under-treated in the course of many days of continuous operation. Actual test data on a hypochlorite tower 16 feet in diameter and 60 feet high, having a theoretical transit time of 300 minutes showed a minimum treatment time of 30 minutes, using conventional "agitation." This is 10% of theoretical. Test results on the present invention were hampered by many apparatus limitations of the mill in which the tests were conducted. The minimum time, however, was brought from 10% of theoretical to from 40 to 80% of theoretical with the relatively wide range apparently depending on the R. P. M. of the shaft, and to a very large degree on consistency. One extremely tangible result was found in that brightness for the same net chlorine consumption increased from 58 to 68.

Fig. 1 shows in partial section a conventional treatment tower 10 comprising an outer shell 12 and an inner shell 14. Shell 14 has a rounded bottom 16 and at the top has a frusto-conical portion 18 and a cylindrical portion 20. Stock is supplied through a pipe 22 and enters the tower through an annular passageway 24. At the top of the tower stock overflows into an annular trough 26 and is removed through a discharge pipe 28. Details of construction of the tower itself form no part of the present invention.

A shaft 30 extends axially of the tower 10 and is driven by a suitable motor and reduction gear unit 32. An agitator arm 34 is mounted at the lower end of the shaft 60 close to the bottom 16 of the tower 10, while a scraper arm 36 is mounted adjacent the upper end of the shaft 30 and operates to clear rising stock out of the tower and into the trough 26.

Intermediate the bottom arm 34 and the top arm 36 are mounted a series of mutually identical impeller blades 38. As shown in Fig. 3 each blade 38 extends from the side of the shaft opposite to the direction of the next adjacent blade.

Details of construction of each impeller blade 38 appear in Figs. 4 through 8. The leading face 40 of each blade 38 is made up of a channel having a vertical wall 42, an upper, horizontal wall 44 and a lower wall 46. The lower wall 46 diverges away from the upper wall 44 from the center of rotation toward the free end of the arm and the depth of the upper and lower walls increases from the center toward the extremity of the arm. The vertical wall 42 follows an involute curve of increasing angularity from the center toward the extremity, that is, a tangent to the wall 42 near the center makes a smaller angle with a radius drawn through the point of tangency than is the case with a tangent and radius near the extremity. Purely for reasons of manufacturing simplicity the curvature of the vertical wall 42 is made up, from the center toward the free end, in three approximately equal sections. In the first section each radius makes an angle of 30 degrees with the tangent at the point where the radius intersects the wall 42. In the second section the angle is 45 degrees and in the free end section the angle is 60 degrees. These precise angles are not, however, critical. The essential feature of the curvature of the vertical wall 62 is that the radial thrust of the impeller arm as it rotates should increase and the circumferential thrust should decrease from the center toward the free end.

The channel defined by the vertical wall 42 and the upper wall 44 and the lower wall 46 is the active or effective portion of the arm. In order however, to increase the structural strength of the arm the walls 44 and 46 extend rearwardly beyond the vertical wall 42 and are connected by a rearward vertical wall 50 which between the lines 6—6 and 8—8 in Fig. 4 defines a rectangular boxlike cross section and makes the arm extremely rigid.

Adjacent the center the upper wall 44 projects beyond the rearward vertical wall 50 and also projects beyond the lower wall 46 to define a pair of flanges 52 and 54. These are cut away as best shown in Fig. 12 to provide a shoulder 52' and a shoulder 54' on the flange 54. A hub member 56 fits within the cut-out portion between the shoulders 52' and 54' and has a central curved part 58 which conforms to the exterior of the shaft 30. A pair of tapered keys 59, 59' respectively are welded to the shoulders 54' and 52' and are also welded to the hub member 56. Both these keys taper downwardly (see key 59 in Fig. 11), key 59 having its right side $x$ inclined to the vertical, while key 59' has its left side $y$ inclined to vertical. This construction has the advantage that the driving torque is always applied perpendicularly to the key faces involved. The side $x$ is referred to hereinafter as the "leading side or wall" and the opposite side of the channel as the "trailing side or wall." The terms "leading" and "trailing" have reference to the direction of rotation of the shaft. It is clear that driving thrust must be imparted by the shaft to the arm by contact beween the trailing, vertical surfaces.

At each point on the shaft 30 where an impeller arm 38 is to be secured there are welded to the shaft 30 a pair of key receiving members 60 each having a tapered keyway 62 to receive the keys 59 and 59'. It is accordingly an extremely simple operation to mount the arms 38 on the shaft 30 by dropping the keys 59 and 59' into the appropriate keyways 62. The assembly is completed by bolting to the flanges 52 and 54 a semi-circular plate 64. This plate tends to prevent the establishment of a flow of stock vertically upward along the shaft 30.

For the sake of simplicity of illustration the parts are shown in the drawings, as though they were simple metal surfaces. In practice, however, all exposed surfaces of the arms 38, including the surfaces of the hub 56, the keys X and Y, as well as all exposed surfaces of the shaft 30, the key receiving member 60 and the keyway 62 are covered with a substantial thickness of rubber or equivalent chemical-resistant material. The precise thickness is not critical but should be at least an eighth of an inch and preferably three sixteenths of an inch. Naturally the plate 64 is similarly rubber covered.

Figs. 9 and 10 illustrate a special form of arm which is particularly useful for operating at relatively high R. P. M. in relatively heavy consistency stock. It will be appreciated that with the presence of as little as 4% pulp a suspension multiplies by many times the effect of fluid friction. These arms have an effective radius at the extremity of as much as 7½ feet; this means that even at 8 revolutions per minute the tip velocity is 6 feet per second. Such a velocity is capable of generating severe fluid friction in suspensions having more than 3% suspended solids. To meet this problem an arm 38' is given anti-cavitation profiling 51 to the rear of the rearward wall 50'. As a practical matter such profiling has its greatest importance in approximately that half of the arm 38' extending inwardly from the free end. It does, however, have an important effect in reducing power requirements for the entire tower and in consequent reductions in cost of the motor, the speed reducer and the associated parts of the final installation.

It is clear from the foregoing that the impeller or equalizer arms continuously carry out a pre-determined radial transfer of stock as distinct from mere vertical displacement such as is accomplished by conventional "agitator" arms and that the effect of such radial transfer is to equalize the progress of the stock as between the center and the periphery of the treatment tower. To be effective the dimensions of the arms, their spacing, and the speed of rotation, must be related to the consistency of the stock and its average rate of travel upward through the tower so as to assure that each arm acts on every portion of advancing stock and that the arms do not bring about a swirling of all the stock at substantially the speed of the arms.

While certain specific embodiments have here been disclosed, it is not intended to limit this invention to the details of this disclosure but only as set forth in the subjoined claims which are to be broadly construed.

What is claimed is:

1. A method of treating pulp comprising: continuously advancing a pulp slurry vertically upward along a cylindrical path; subjecting all pulp arriving at a predetermined level to a slow, positive, continuous, smooth, radially outward displacement by causing said pulp to flow along a substantially cycloidal path and reflecting from the boundary of said cylindrical path the pulp thus radially outward displaced in a radially inward direction to drive before it other pulp immediately above and below said level, said inward and outward displacements being continuous and uninterrupted whereby to minimize agitation between mutually adjacent fibers.

2. A vertical, cylindrical material treatment tower having a rotatable shaft extending axially therethrough; at least one impeller arm secured to said shaft, said arm having its leading face in the form of an open channel unobstructed from the shaft through the free end the cross-sectional area of said channel increasing from adjacent the shaft to the free end of the arm.

3. The device of claim 2 in which the cross-section of said channel is substantially rectangular at all points.

4. The device of claim 3 in which said channel is swept back relative to the direction of rotation of the arm to provide a radial component of motion decreasing from the shaft to the free end.

5. A rotary impeller blade for use in material treatment towers, said blade being swept back rearwardly relative to its intended direction of rotation and having its intended leading face in the form of an open channel unobstructed from end to end, said blade having means at one end to mate with securing means on a shaft, said channel increasing in cross-sectional area from the shaft end to the free end.

6. An arm as set forth in claim 5 in which the channel is substantially rectangular in cross-section.

7. An arm as set forth in claim 5 in which the arm, from the shaft end to substantially its free end, has a hollow, box-like cross-section in back of said channel.

8. An arm as set forth in claim 6 in which the arm, from the shaft end to substantially its free end, has a hollow, box-like cross-section in back of said channel.

9. A device for securing an arm to a vertical shaft for rotation therewith in a predetermined direction comprising means defining a channel of rectangular cross-section extending generally parallel to the shaft axis, the inner trailing wall of said channel being vertical and the opposite leading wall being inclined to the vertical and a key secured to said arm, said key being tapered to fit said channel whereby all rotative driving force from said shaft to said arm is transmitted through contact between the vertical trailing wall of said channel and the adjacent wall of said key.

10. A device according to claim 9 including a pair of channel-forming means secured to opposite sides of the shaft and a pair of keys on the arm, each key fitting a channel.

ELMER R. BURLING.
JOHN P. RICH.

REFERENCES CITED

The following references are of record in the file of this patent:

UNITED STATES PATENTS

| Number | Name | Date |
|---|---|---|
| 438,606 | Currier | Oct. 21, 1890 |
| 700,033 | Glatz | May 13, 1902 |
| 911,567 | Berkowitz | Feb. 9, 1909 |
| 1,383,881 | Thomas | July 5, 1921 |
| 1,445,935 | Daman et al. | Feb. 20, 1923 |
| 1,446,639 | Cleve | Feb. 27, 1923 |
| 2,431,478 | Hill | Nov. 25, 1947 |

OTHER REFERENCES

Ott, "Cellulose and Cellulose Polymers," vol. V of "High Polymers," page 586, Interscience Publishers, New York, N. Y., 1943.